H. G. GINACA.
PROCESS FOR TREATING PINEAPPLES.
APPLICATION FILED OCT. 29, 1913.
1,121,007.
Patented Dec. 15, 1914.
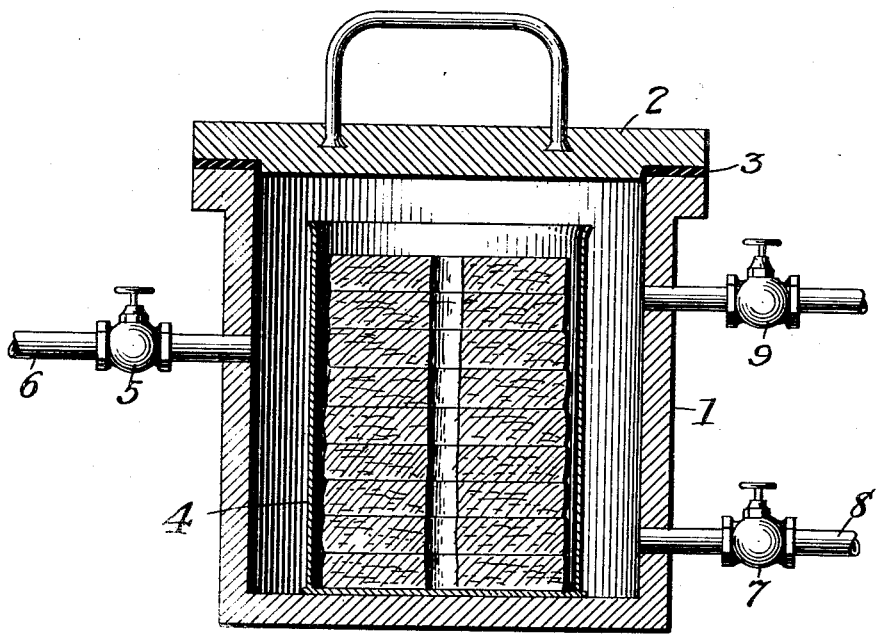

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF THE TERRITORY OF HAWAII.

PROCESS FOR TREATING PINEAPPLES.

1,121,007.     Specification of Letters Patent.     Patented Dec. 15, 1914.

Application filed October 29, 1913. Serial No. 798,025.

*To all whom it may concern:*

Be it known that I, HENRY GABRIEL GINACA, a citizen of the United States, residing at Honolulu, in the county of Honolulu and Territory of Hawaii, have invented certain new and useful Improvements in Processes for Treating Pineapples; and I do hereby declare the following to be a full, clear and exact description of the invention, such as will enable others skilled in the art to which it appertains to make and use the same.

This invention relates to a process for treating fruit, particularly pineapples, during the operation of canning. Its object is to facilitate the syruping of vacuumized fruit and more perfectly incorporate the sugar in the fruit, thereby improving its quality.

Another object is to eliminate the passing of the cans after syruping through the old type of steam exhauster, which is the usual method of driving the air and gas out of the fruit and heating the fruit in the cans before the cans are sealed.

A further object is to eliminate syruping the fruit while under a vacuum, which requires complicated machinery for its practical accomplishment in a commercially successful manner.

The present process contemplates, vacuumizing in a chamber the fruit at normal temperature contained in the open top cans, then admitting steam to fill the pores or cells of the fruit, from which the air and gas has been removed with water condensed from said steam, the removal of the cans from the chamber, and then treating the fruit in these cans with a syrup, preferably consisting of refined cane sugar and water. In exhausting the air from the chamber the air and gases in the cells or pores of the fruit is removed at the same time, in a well known manner, so that during the succeeding treatment by steam these cells or pores are filled with water condensed from the steam, thereby preventing air from entering the cells or pores when the vacuum is broken and the fruit is removed from the chamber. Consequently during the succeeding treatment with syrup this water now in the cells or pores of the fruit readily takes up sugar from the syrup by endosmose or otherwise. The treatment by steam also heats the fruit, which is desirable.

Reference is to be had to the accompanying drawing, which illustrates my invention in sectional elevation.

The box 1 is provided with a removable cover 2 with a gasket 3 interposed, and forms an air tight chamber in which may be placed the open top can 4 filled with peeled fruit to be treated. The air in this chamber is now exhausted by opening the valve 5 in the pipe 6, which connects the interior of the box 1 with a vacuum pump or with any other suitable means for exhausting the air, to preferably about 28 inches of mercury. At the same time the air or gases in the cells or pores of the fruit in the can 4 is removed with the air from the chamber. The valve 5 is now closed, and the valve 7 in the pipe 8 connected to a steam supply is opened, thereby admitting steam to the chamber. When the fruit in the can 4 has been heated, preferably to about 140 degrees F., the valve 7 is closed. The valve 9 is now opened to connect the chamber with the atmosphere and break the vacuum, and the can 4 is then removed from the box 1 upon lifting off the cover 2. The can 4 is now treated with a hot syrup, preferably of refined cane sugar and water, and the heated fruit, the pores and cells of which now contain water condensed during the treatment by steam, takes up sugar rapidly from the syrup and sweetens the fruit, and the can is now ready for sealing.

Of course a number of tins or cans of fruit are treated as described simultaneously in the chamber, although but one can is illustrated in the drawing.

It will be noted that the air or gas in the cells or pores of the peeled fruit in the cans has been replaced by water and that the fruit has been heated by steam while under a vacuum, that the cans are then removed and syruped and made ready for sealing, by the process described, thereby eliminating the steam exhauster in the process heretofore employed. At the same time the quality of the product is improved.

I claim:

1. A process for treating fruit, which consists in withdrawing the air and gases from all of the cells and pores of the fruit, admitting steam to the cells and pores, and then treating the fruit with a syrup or sugar solution.

2. A process for treating pineapples comprising, placing in a chamber the open top cans containing the peeled fruit, exhausting the air from said chamber, then admitting steam to the chamber, and then treating the fruit in the cans with a syrup or sugar solution after their removal from the said chamber.

In testimony whereof I affix my signature, in presence of two witnesses.

HENRY GABRIEL GINACA.

Witnesses:
RAY B. RIETOW,
S. M. LOWREY.